(12) United States Patent
Hayes et al.

(10) Patent No.: US 7,980,909 B2
(45) Date of Patent: Jul. 19, 2011

(54) DISPLAY DEVICE

(75) Inventors: Robert A. Hayes, Eindhoven (NL); Bokke J. Feenstra, Nuenen (NL); Ivo G. J. Camps, Eindhoven (NL)

(73) Assignee: Liquavista B.V., Eindhoven (NL)

( * ) Notice: Subject to any disclaimer, the term of this patent is extended or adjusted under 35 U.S.C. 154(b) by 562 days.

(21) Appl. No.: 11/547,979

(22) PCT Filed: Mar. 25, 2005

(86) PCT No.: PCT/IB2005/051035
§ 371 (c)(1),
(2), (4) Date: Sep. 6, 2007

(87) PCT Pub. No.: WO2005/098797
PCT Pub. Date: Oct. 20, 2005

(65) Prior Publication Data
US 2008/0014823 A1    Jan. 17, 2008

(30) Foreign Application Priority Data
Apr. 8, 2004   (EP) .................................... 04101454

(51) Int. Cl.
*H01J 9/00* (2006.01)
(52) U.S. Cl. ........................... 445/23; 359/253; 359/254
(58) Field of Classification Search .................. 359/253, 359/254, 666; 445/23
See application file for complete search history.

(56) References Cited

U.S. PATENT DOCUMENTS

| 4,741,988 | A | 5/1988 | Van der Zande et al. | |
|---|---|---|---|---|
| 6,369,954 | B1 * | 4/2002 | Berge et al. | 359/666 |
| 2002/0131152 | A1 | 9/2002 | Rong-Chang et al. | |
| 2002/0176148 | A1 * | 11/2002 | Onuki et al. | 359/253 |
| 2005/0002113 | A1 * | 1/2005 | Berge | 359/666 |
| 2005/0104804 | A1 | 5/2005 | Feenstra et al. | |

FOREIGN PATENT DOCUMENTS

| JP | 2000290566 A | 10/2000 |
|---|---|---|
| JP | 2002156666 A | 5/2002 |
| WO | 03/071346 | 8/2003 |
| WO | 03/071346 A | 8/2003 |

OTHER PUBLICATIONS

International Search Report mailed Jan. 13, 2006 in PCT/IB2005/051035.

* cited by examiner

*Primary Examiner* — Toan Ton
*Assistant Examiner* — Zachary Snyder
(74) *Attorney, Agent, or Firm* — BainwoodHuang

(57) ABSTRACT

A display device based on e.g. oil layer break up or oil layer displacement having at least two different states, having a wall (13) height which is insignificant compared to the pixel width and also to the typical curvature of the oil interface at the tip of the dosing needle (15), the pixels are dosed without inserting the needle into the pixels. As the dosing needle no longer has to enter the pixel, pixels can be dosed with oil (5) from a relatively large injection needle.

19 Claims, 2 Drawing Sheets

Figures 4A, 4B:
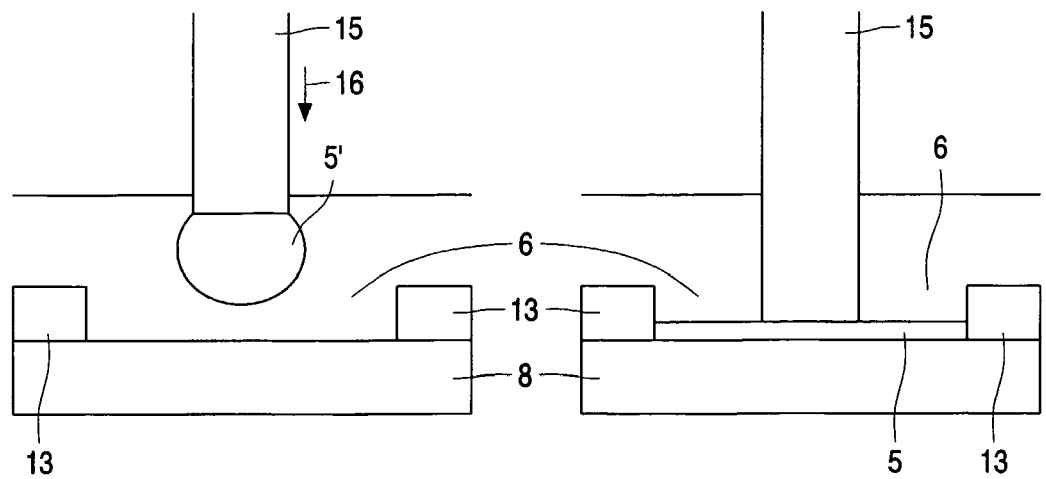

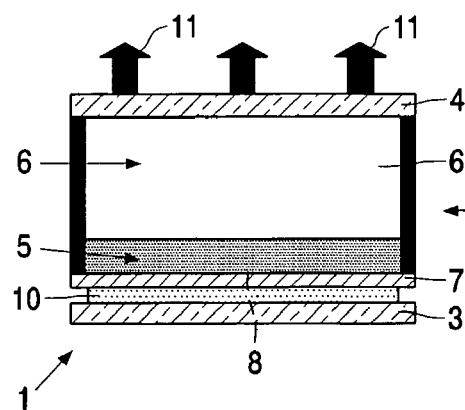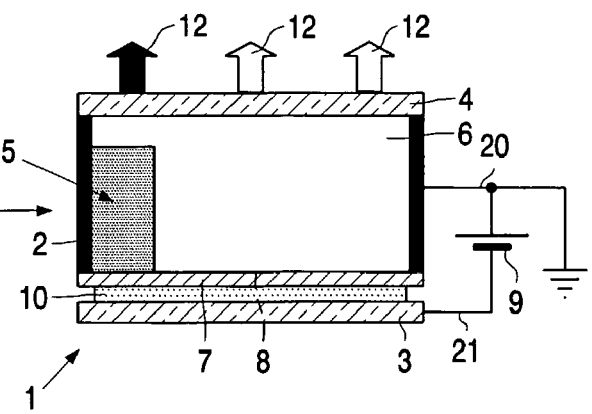
FIG. 1a    FIG. 1b
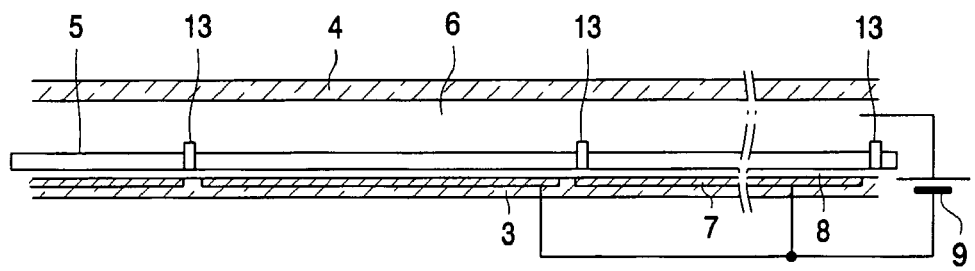
FIG. 2
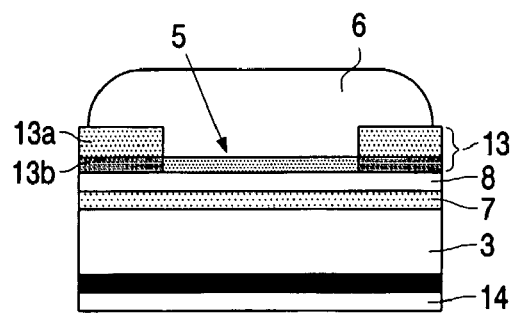
FIG. 3

DISPLAY DEVICE

This application is the US national phase of international application PCT/IB2005/051035 filed 25 Mar. 2005, which designated the U.S. and claimed priority of EP 04101454.9 filed 8 Apr. 2004, the entire contents of each of which are hereby incorporated by reference.

The invention relates to a method for manufacturing an optical element comprising at least one first fluid and a second fluid immiscible with each other the device at least having one support plate comprising a surface area less wettable to the second fluid.

In particular the invention relates to a method for manufacturing a display device comprising picture elements (pixels) having at least one first fluid and a second fluid immiscible with each other within a space between a first transparent support plate and a second support plate. In such displays based on electrowetting, the one fluid generally is electroconductive or polar e.g. water, while the other fluid is an oil.

Optical switches may be used in shutter applications, diaphragms, but also in switchable color filters in e.g. display applications. If the fluid is a (colored) oil and the second fluid is water (due to interfacial tensions) a two-layer system is provided which comprises a water layer and an oil layer. However, if a voltage is applied between the water and an electrode on the first support plate the oil layer moves aside or breaks up due to electrostatic forces. Since parts of the water now penetrate the oil layer the picture element becomes partly transparent.

Display devices based on this principle have been described in PCT-Application PCT/IB/03/00196 (PH-NL 02.0129).

In most of the embodiments shown in this Application a picture element corresponds to a defined space (e.g. a substantially closed space) and in the second state the other fluid substantially completely adjoins the first support plate. In one embodiment shown in this Application picture elements are described in which the picture element walls do not extend across the whole picture element thickness.

The performance of these display devices, in particular the control of gray levels within one display device, is critically dependent on the reproducible dosing of oil to several picture elements (pixels) in said display device. In mass fabrication this is also essential for reproducible manufacturing of large numbers of display devices.

When oil is dosed accurately to separate picture elements with uniform geometry and surface properties on a pixel-by-pixel base, then very good gray level control can be obtained. While this can be done for large picture elements containing correspondingly large oil volumes by injecting the oil into the water layer, as the picture element size decreases the dosing becomes more difficult if not impossible at very small picture element dimensions. Apart from this dosing on a pixel-by-pixel base is very time consuming.

It is one of the objects of the present invention to overcome at least partly the above-mentioned problems.

To this end a method according to the invention comprises the steps of:
  defining the less wettable surface area; p1 providing a layer of the second fluid at least at the less wettable surface areas; p1 introducing the first fluid from the upper side of said second fluid layer; and
  closing a space between a further transparent support plate and the support plate.

The invention is based on the insight that that although the oil may contact the picture element walls it preferentially migrates to the less wettable surface after introduction of the oil e.g. after a needle injecting the oil has passed. This is possibly due to a preference of the picture element walls (or inter-pixel surfaces) to remain water wet.

The inventive method makes introduction of the second fluid possible by means of an injection into the first fluid without using pixel-by-pixel techniques, for instance by means of spreading the second fluid over the first fluid.

In this way the second fluid can be introduced into the first fluid of several display elements simultaneously.

Although not strictly necessary the less wettable surface area is preferably separated by more wettable surfaces provided on walls.

These and other aspects of the invention are apparent from and will be elucidated with reference to the embodiments described hereinafter.

Figure 5:
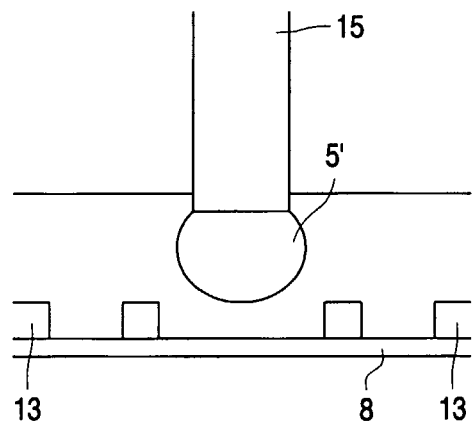
Figure 6:
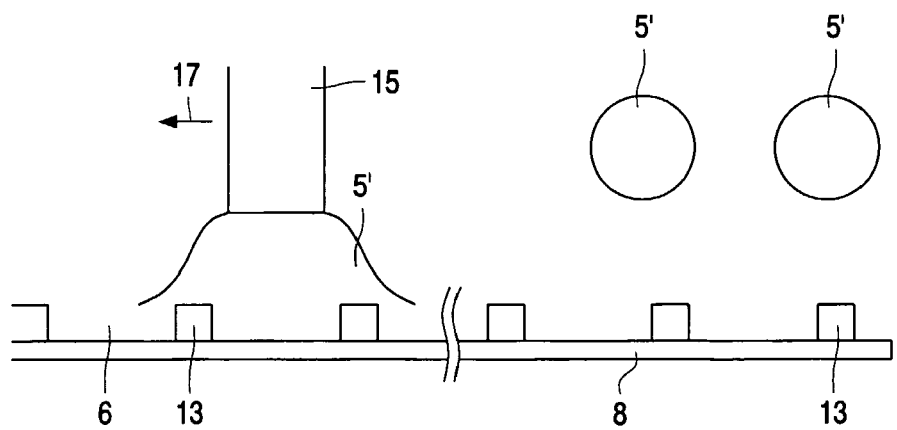

In the drawings:

FIG. 1 is a diagrammatic cross-section of a part of a display device, to show the principle on which display principle the invention is based, FIGS. 2 and 3 are further diagrammatic cross-section of a part of such a display device according to the invention, FIG. 4 is a diagrammatic cross-section of a part of a display device, which shows the present method of manufacturing, while FIG. 5 in a diagrammatic cross-section of a part of a display device shows some limitations of the present method of manufacturing and FIG. 6 in a diagrammatic cross-section shows the method of manufacturing according to the invention.

The Figures are diagrammatic and not drawn to scale. Corresponding elements are generally denoted by the same reference numerals.

FIG. 1 shows a diagrammatic cross-section of a part of a display device 1 which shows the principle on which a display device according to the invention is based. Between two transparent substrates or support plates 3, 4 a first fluid 5 and a second fluid 6 are provided, which are immiscible with each other. The first fluid 5 is for instance an alkane like hexadecane or as in this example a (silicone) oil. The second fluid 6 is electroconductive or polar, for instance water or a salt solution (e.g. a solution of KCl in a mixture of water and ethyl alcohol).

In a first state, when no external voltage is applied (FIG. 1a) the fluids 5, 6 adjoin the first and second transparent support plates 3, 4 of e.g. glass or plastic. On the first support plate 3 a transparent electrode 7, for example indium (tin) oxide is provided and an intermediate less wettable (hydrophobic) layer 8, in this example an amorphous fluoropolymer (AF1600).

When a voltage is applied (voltage source 9) via interconnections 20, 21 the layer 5 moves aside or breaks up into small droplets (FIG. 1b). This occurs when the electrostatic energy gain is larger than the surface energy loss due to the creation of curved surfaces. As a very important aspect it was found that reversible switching between a continuous film 5 covering the support plate 3 and a film adjoining the wall 2 is achieved by means of the electrical switching means (voltage source 9).

FIG. 2 shows an embodiment of a display device according to the invention, in which the picture element walls 13 do not extend across the whole picture element thickness. Such walls may be obtained by offset printing or other printing techniques known in the art. It appears that the oil film 5 is very stable, which is enhanced even further as the picture element size decreases. So during switching the oil remains confined in each area. The other reference numerals have the same meaning as those in FIG. 1.

The layer 13 in this example is approximately 20 μm thick or less and consists of a lower part $13^b$, more wettable to the first fluid (hydrophobic) and an upper less wettable (hydrophilic) part $13^a$ (see FIG. 3). In this way the wetting of the lower part of the picture element wall by the oil ensures a homogeneous optical off-state. Then when the picture element is activated the reversibility of oil movement due to the less wettable (hydrophilic) upper part is also maintained.

As mentioned in the introduction the performance of such electrowetting display picture elements, in particular gray level control, is critically dependent on the reproducible dosing of oil to display picture elements. A methodology used to dose larger picture elements utilizes for instance a micromanipulator driven syringe 15 (inserted through the water layer 6 in the direction of arrow 16) to add the required amount of colored oil to a picture element (FIG. 4a). When the pendant oil droplet 5' touches the hydrophobic fluoropolymer layer 8 it spreads to form a film (in this example with a thickness of the order of 10 microns (FIG. 4b).

The minimum film thickness depends on both the picture element size and also the oil/water interfacial tension. Using this method the syringe (or dosing needle) 15 must be inserted into each picture element area, which requires that the needle dimension must be smaller than that of the picture element to be manufactured. For smaller picture elements however the needle dimension cannot be reduced correspondingly (FIG. 5), leading to the possibility of intermixing oil droplets 5' of neighboring pictures. Moreover filling at a picture element level is rather time-consuming.

FIG. 6 shows a method according to the invention to dose picture elements in an electrowetting display, in which the oil droplets 5' may have a larger diameter than the picture element area. The syringe (or dosing needle) 15 is moved across the display substrate, for instance in a lateral movement as shown by arrow 17, while the liquid 5' is continuously dosed through the liquid 6 (water). What has been observed is that although the oil 5 contacts the picture element walls it preferentially migrates to the hydrophobic fluoropolymer surface. This is probably because the more wettable picture element walls prefer to remain water wet. So, the picture elements can be dosed without inserting the needle into the picture elements (FIG. 6). As the dosing needle no longer has to enter the picture element, picture elements can be dosed with oil from a relatively large injection needle. Maintaining a fixed height of the dosing needle relative to the substrate is also helpful, while automisation of this procedure improves dosing homogeneity.

The invention is not restricted to the examples mentioned above. Instead of using a needle spraying of oil droplets 5' is also possible, as shown in the right hand side of FIG. 6. Different colored oils can also be dosed to adjacent picture element rows with this method. Pixels may be separated by chemically preparing the substrate instead of using physical walls.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. A method for manufacturing an optical element comprising at least one first fluid (5) and a second fluid (6) immiscible with each other the optical element at least having one support plate comprising a surface area less wettable to the second fluid, the method comprising the steps of:
   defining the less wettable surface area;
   providing a layer of the second fluid (6) at least at the less wettable surface area;
   introducing the first fluid (5) from the upper side of said second fluid layer; and
   closing a space between a further transparent support plate (4) and the support plate (34).

2. A method according to claim 1 in which areas having a more wettable surface area surround the less wettable surface area.

3. A method according to claim 1 in which the more wettable surfaces (13a) are provided on walls (13).

4. A method according to claim 1 for manufacturing a display device in which the first fluid (5) is introduced by means of an injection through the second fluid (6).

5. A method according to claim 1 for manufacturing a display device in which the first fluid (5) is introduced by means of spreading the first fluid (5) over the second fluid (6).

6. A method according to claim 4 in which the first fluid (5) is introduced into the second fluid (6) of several display picture elements simultaneously.

7. A method according to claim 1 or 4, in which the injection is carried out using a dosing needle.

8. A method according to claim 7, wherein the first fluid is continuously dosed when the needle is moved across the one support plate.

9. A method according to claim 7, wherein areas having a more wettable surface area surround the less wettable surface area and the first fluid preferentially migrates to the less wettable surface area.

10. A method according to claim 8, wherein areas having a more wettable surface area surround the less wettable surface area and the first fluid preferentially migrates to the less wettable surface area.

11. A method according to claim 7, wherein the first fluid is dosed in droplets.

12. A method according to claim 11, wherein the droplets are sprayed.

13. The method of claim 1, wherein:
   defining the less wettable surface area comprises defining a set of less wettable surface areas, each less wettable surface area of the set of less wettable areas being surrounded by a more wettable surface area relative to the less wettable surface area and each less wettable surface area of the set of less wettable areas corresponding to a picture element of a set of picture elements of a display device;
   providing a layer of the second fluid (6) at least at the less wettable surface area comprises disposing the second fluid as a second fluid layer on each of the less wettable surface areas; and
   introducing the first fluid (5) from the upper side of said second fluid layer comprises:
      introducing the first fluid to the second fluid layer with a dosing apparatus while moving the dosing apparatus across the set of less wettable surface areas, the first fluid contacting the more wettable surface areas and preferentially migrating to each less wettable surface area of the set of less wettable areas.

14. The method of claim 13, wherein the more wettable surface areas are provided on picture element walls.

15. The method of claim 13, comprising maintaining the dosing apparatus at a fixed height relative to the set of less wettable areas while moving the dosing apparatus across the set of less wettable surface areas.

16. The method of claim 13, wherein the dosing apparatus is a dosing needle.

17. The method of claim 13 including inserting the dosing apparatus into the second fluid layer before said introducing of the first fluid to the second fluid layer.

18. The method of claim 1 wherein the less wettable surface area is configured as a hydrophobic fluoropolymer layer.

19. The method of claim 1 wherein the second fluid is a water-based fluid and the first fluid is an oil-based fluid.

* * * * *